US012008136B2

(12) United States Patent
Balch et al.

(10) Patent No.: US 12,008,136 B2
(45) Date of Patent: Jun. 11, 2024

(54) SYSTEMS AND METHODS FOR PRIVACY-PRESERVING INVENTORY MATCHING WITH SECURITY AGAINST MALICIOUS ADVERSARIES

(71) Applicant: JPMORGAN CHASE BANK, N.A., New York, NY (US)

(72) Inventors: Tucker Richard Balch, Suwanee, GA (US); Benjamin E Diamond, New York, NY (US); Antigoni Ourania Polychroniadou, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 312 days.

(21) Appl. No.: 17/649,115

(22) Filed: Jan. 27, 2022

(65) Prior Publication Data
US 2022/0237322 A1 Jul. 28, 2022

(30) Foreign Application Priority Data
Jan. 28, 2021 (GR) .............................. 20210100050

(51) Int. Cl.
*G06F 21/62* (2013.01)
*H04L 9/08* (2006.01)
*H04L 9/30* (2006.01)
(52) U.S. Cl.
CPC .......... *G06F 21/6245* (2013.01); *H04L 9/085* (2013.01); *H04L 9/3066* (2013.01); *H04L 2209/56* (2013.01)

(58) Field of Classification Search
CPC ... G06F 21/6245; H04L 9/085; H04L 9/3066; H04L 2209/56
(Continued)

(56) References Cited
U.S. PATENT DOCUMENTS 11,158,000 B2 * 10/2021 Mazier .................... G06Q 40/06
11,170,439 B2 * 11/2021 Massacci ................ G06F 21/64
(Continued)

OTHER PUBLICATIONS

International Search Report, dated May 10, 2022, from corresponding International Application No. PCT/US2022/070403.
(Continued)

*Primary Examiner* — Michael S McNally
(74) *Attorney, Agent, or Firm* — GREENBERG TRAURIG LLP

(57) ABSTRACT

A method for privacy-preserving inventory matching may include: (1) receiving a plurality of axe submissions; (2) arranging the parties into data structures based on a direction in the party's axe submission; (3) sending each party's commitment to the other party; (4) receiving, from each party, output secret-shares of an arithmetized comparison circuit; (5) verifying that the output secret-shares of the arithmetized comparison circuit received from the parties match commitments to the output secret-shares sent by the respective opposite party; (6) identifying a minimal party based on the outputs of the arithmetized comparison circuit; (7) generating and sending a proof of the minimal party identification to the minimal party; (8) receiving a minimal quantity integer from the minimal party; (9) revealing the minimal quantity integer to the first party and the second party; and (10) executing the trade for the minimal quantity integer.

20 Claims, 3 Drawing Sheets

(58) Field of Classification Search
USPC .......................................................... 726/26
See application file for complete search history.

(56) References Cited

U.S. PATENT DOCUMENTS

2009/0177591 A1* 7/2009 Thorpe .................. G06Q 40/06
  705/37
2010/0185863 A1 7/2010 Rabin et al.

OTHER PUBLICATIONS

Written Opinion of the International Searching Authority, dated May 10, 2022, from corresponding International Application No. PCT/US2022/070403.
Balch, Tucker, et al, "SecretMatch inventory matching from fully homomorphic encryption", Proceedings of the 26th ACM SIGKDD International Conference on Knowledge Discovery & Data Mining, ACMPUB27, New York, NY, USA, Oct. 15, 2020 (Oct. 15, 2020), pp. 1-7.

* cited by examiner

SYSTEMS AND METHODS FOR PRIVACY-PRESERVING INVENTORY MATCHING WITH SECURITY AGAINST MALICIOUS ADVERSARIES

RELATED APPLICATIONS

This application claims priority to Greek Patent Application No. 20210100050, filed Jan. 28, 2021, the disclosure of which is hereby incorporated, by reference, in its entirety.

BACKGROUND OF THE INVENTION

1. Field of the Invention

Embodiments are generally directed to systems and methods for privacy-preserving inventory matching with security against malicious adversaries.

2. Description of the Related Art

An "axe" is an interest on the part of a firm to buy or sell a particular security. In general, a firm possessing an axe would prefer to keep it private, as its disclosure would reveal the direction in which the firm wants to trade the security and the quantity of that security which it wishes to trade. When other market participants become informed of how a particular firm is axed in a given security, they can choose to offer the security at an unfavorable price, or drive the price of the security in a disadvantageous direction, before the firm is able to transact. Because of these risks, firms keep their axes secret.

If the bank is unable to find a client whose interest opposes its own, then the bank must trade in a public market, which introduces additional costs and the possibility of adverse price movement. Banks, therefore, expend efforts in locating compatibly-interested clients, with whom they can "internalize" their trades.

When a bank finds two clients who are interested in the same security, and with opposite directions, the bank may perform a similar "internalization" procedure, whereby it effects the appropriate trade on behalf of the two clients. This internalization, when possible, is advantageous to both clients, as it likewise allows them to avoid "going to market."

In order to incentivize clients to trade, banks publish lists of securities which they are interested in trading. Each such "axe list" allows the publishing bank's clients to locate available synthetic trades at reduced financing rates, and, as a result, to increase trading activity and achieve better internalization. To construct this list, the publishing bank aggregates internal firm inventory along with risk inventory resulting from facilitating client trades. This approach is, however, unsatisfactory, as (1) the bank reveals its inventory and in fact, leaks its own axe; and (2) the trading activity of clients which contribute to the list is implicitly revealed to other clients, through the continual publication of the axe list (even though the list is anonymized its information is aggregated).

A cryptographic protocol is a joint algorithm in which multiple distinct parties engage, which, on the one hand, allows the respective parties to ascertain the value of some privileged information (such as, for example, the output of a known function on secret inputs which the parties respectively possess) and, on the other hand, also provides security guarantees (concerning the extent to which these secret inputs necessarily remain protected). A protocol is said to be secure under a semi-honest corruption if an attacker, upon gaining access to one of the participants, and controlling this participant passively (that is, by observing its internal state and examining the messages it receives and sends) can nonetheless learn nothing about the other parties' secret inputs. A protocol is secure under a malicious corruption if even an attacker who gains access to one of the participants and may alter this participant's behavior arbitrarily can nonetheless neither learn anything about any other party's secret input nor cause the protocol to output an incorrect result.

SUMMARY OF THE INVENTION

Systems and methods for privacy-preserving inventory matching with security against malicious adversaries are disclosed. In one embodiment, at a server comprising at least one computer processor, a method for privacy-preserving inventory matching may include: (1) receiving a plurality of axe submissions, each axe submission from a party and comprising a direction and a quantity commitment to a quantity integer, wherein the quantity integer is not revealed in the quantity commitment; (2) arranging the parties into data structures based on the direction in the party's axe submission; (3) for a first party and a second party, the first party and the second party being in different data structures, sending each party's quantity commitment to the other party; (4) receiving, from the first party and the second party, output secret-shares of an arithmetized comparison circuit; (5) verifying that the output secret-shares of the arithmetized comparison circuit received from the first party and the second party match quantity commitments to the output secret-shares sent by the respective opposite party; (6) identifying a minimal party based on the outputs of the arithmetized comparison circuit; (7) generating and sending a minimal party identification proof of the minimal party identification to the minimal party; (8) receiving a minimal quantity integer from the minimal party, wherein the minimal quantity integer is the quantity integer for the minimal party; (9) revealing the minimal quantity integer to the first party and the second party; and (10) executing a trade for the minimal quantity integer.

In one embodiment, the quantity commitment is generated using a Pedersen scheme over an elliptic curve of prime order.

In one embodiment, within each data structure, the parties are arranged based on an order of receipt of each party's axe submission.

In one embodiment, the method may also include receiving, from the first party and the second party, a signed quantity commitment; and sending, to the other party, the signed quantity commitment.

In one embodiment, the minimal party identification proof is a one-out-of-many proof.

In one embodiment, the minimal party verifies the minimal party identification proof in response to receiving the minimal party identification proof.

In one embodiment, the server sends the minimal party identification proof to the first party and the second party in response to the arithmetized comparison circuit outputs indicating that the first party and the second party have the same quantity integer.

According to another embodiment, at a first party electronic device comprising at least one computer processor, a method for privacy-preserving inventory matching may include: (1) submitting, to a server, an axe submission comprising a direction and a first party quantity commitment to a first party quantity integer, wherein the first party quantity integer is not revealed in the first party quantity commitment; (2) sending, via the server, the first party quantity commitment to a second party and receiving a second party quantity commitment to a second party quantity integer from the second party, wherein the second party quantity integer is not revealed in the second party quantity commitment; (3) decomposing the first party quantity integer into a plurality of bits; (4) performing a bit-commitment protocol process on the plurality of bits comprising two first party secret-shares; (5) sending the second party one of the first party secret-shares; (6) receiving a second party secret share from the second party; (7) executing an arithmetized comparison circuit on the first party secret-share that was not sent to the second party and the second party secret-share received from the second party; (8) sending outputs of the arithmetized comparison circuit to the server, wherein the server verifies that the outputs received from the first party and outputs received from the second party match commitments to the output secret-shares sent by the second party and the first party, respectively; (9) receiving, from the server, a minimal party identification proof of that the first party is a minimal party; and (10) verifying the minimal party identification and sending the first party quantity integer to the server, wherein the first party quantity integer is a minimal quantity integer. A transaction is executed for the minimal quantity integer.

In one embodiment, the first party quantity commitment and/or the second party quantity commitment is generated using a Pedersen scheme over an elliptic curve of prime order.

In one embodiment, the minimal party identification proof is a one-out-of-many proof.

In one embodiment, the method may also include verifying the minimal party identification proof in response to receiving the minimal party identification proof.

In one embodiment, the two first party secret-shares are based on a first random scalar modulo p and a selecting a second scalar which sums with the first random scalar modulo p to the bit.

In one embodiment, the method may also include generating a sum proof that a sum of the commitment to the first party secret-share and the commitment to the second party secret-share is a bit commitment; sending the sum proof to the second party; generating a matching proof that the sum of the commitment to the first party secret-share and the commitment to the second party secret-share match bits in the decomposed first party quantity integer; and sending the matching proof to the second party.

In one embodiment, the arithmetized comparison circuit evaluates the first party secret-share that was not sent to the second party and the second party secret-share received from the second party.

According to another embodiment, at a first party electronic device comprising at least one computer processor, a method for privacy-preserving inventory matching may include: (1) submitting, to a server, an axe submission comprising a direction and a first party quantity commitment to a first party quantity integer, wherein the first party quantity integer is not revealed in the first party quantity commitment; (2) sending, via the server, the first party quantity commitment to a second party and receiving a second party quantity commitment to a second party quantity integer from the second party, wherein the second party quantity integer is not revealed in the second party quantity commitment; (3) decomposing the first party quantity integer into a plurality of bits; (4) performing a bit-commitment protocol process on the plurality of bits comprising two first party secret-shares; (5) sending the second party one of the first party secret-shares; (6) receiving a second party secret share from the second party; (7) executing an arithmetized comparison circuit on the first party secret-share that was not sent to the second party and the second party secret-share received from the second party; (8) sending outputs of the arithmetized comparison circuit to the server, wherein the server verifies that the outputs received from the first party and outputs received from the second party match commitments to the output secret-shares sent by the second party and the first party, respectively; and (9) receiving, from the server, an identification of a minimal quantity integer, wherein the minimal quantity integer is the second party quantity integer. A transaction is executed for the minimal quantity integer.

In one embodiment, the first party quantity commitment and/or the second party quantity commitment is generated using a Pedersen scheme over an elliptic curve of prime order.

In one embodiment, the two first party secret-shares are based on a first random scalar modulo p and a selecting a second scalar which sums with the first random scalar modulo p to the bit.

In one embodiment, the method may also include generating a sum proof that a sum of the commitment to the first party secret-share and the commitment to the second party secret-share is a bit commitment; sending the sum proof to the second party; generating a matching proof that the sum of the commitment to the first party secret-share and the commitment to the second party secret-share match bits in the decomposed first party quantity integer; and sending the matching proof to the second party.

In one embodiment, the arithmetized comparison circuit evaluates the first party secret-share that was not sent to the second party and the second party secret-share received from the second party.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

The disclosures of U.S. patent application Ser. No. 17/110,253, filed Dec. 2, 2020, and of Greek Patent Application Number 20190100549, filed Dec. 6, 2019, are hereby incorporated, by reference, in their entireties.

Embodiments are directed to systems and methods for privacy-preserving inventory matching with security against malicious adversaries.

Figure 1:
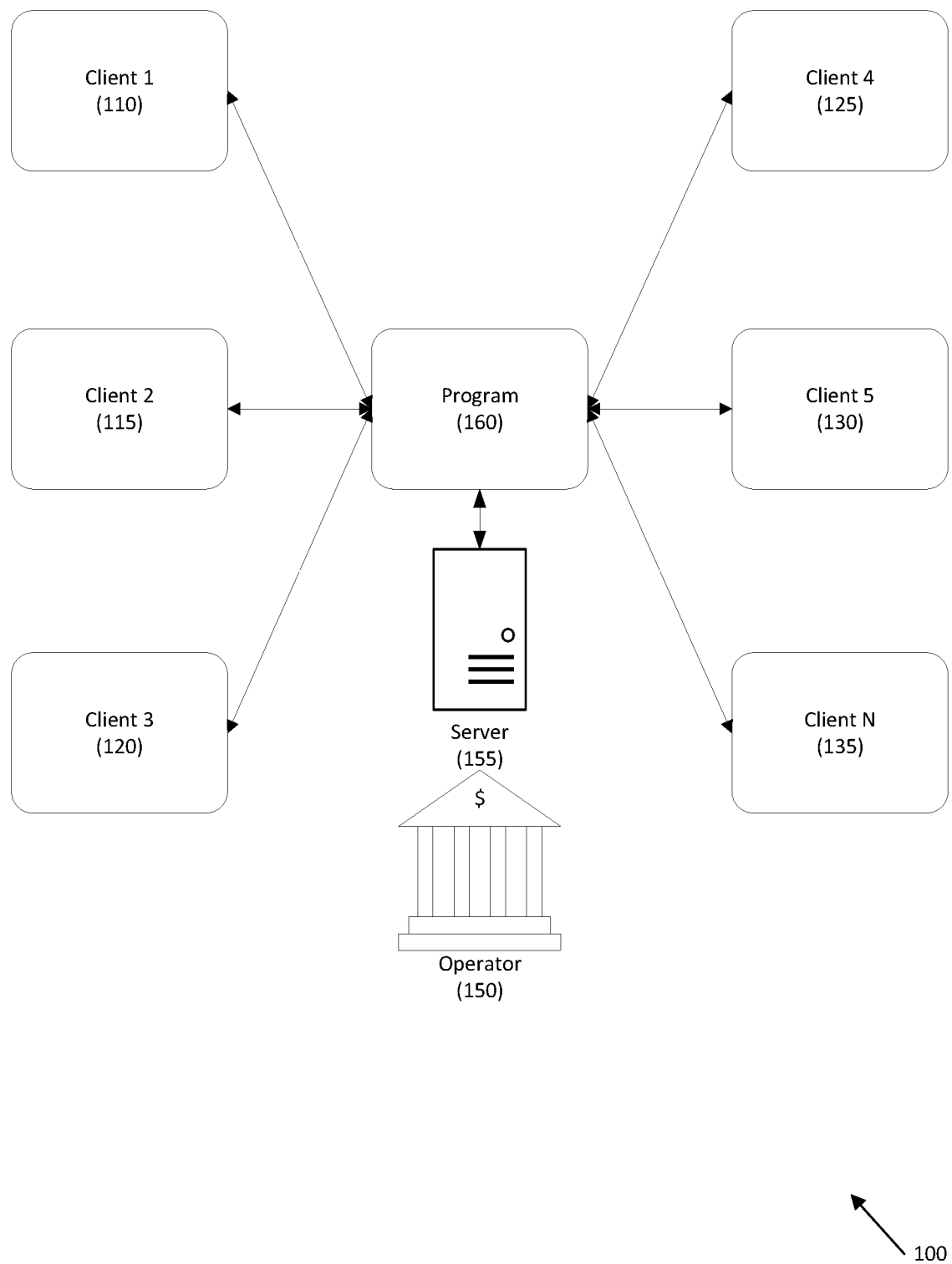
FIG. 1 depicts a system for privacy-preserving inventory matching with security against malicious adversaries according to one embodiment.

Referring to FIG. 1, a system for privacy-preserving inventory matching is disclosed according to one embodiment. System 100 may include a plurality of clients (e.g., clients 110, 115, 120, 125, 130, 135), operator 150 (e.g., a bank or financial institution), operator server 155, and matching computer program or application 160.

Although FIG. 1 depicts six clients, this is exemplary only and it should be recognized that a greater or fewer number of clients may be provided as is necessary and/or desired.

In one embodiment, one or more of clients 110, 115, 120, 125, 130, and 135 may be clients of, or associated with, operator 150. In another embodiment, one or more of clients 110, 115, 120, 125, 130, and 135 may not be associated with operator 150.

In one embodiment, operator 150 may host one or more server 155, which may be physical servers, cloud-based servers, etc. In another embodiment, server 155 may execute matching computer program or application 160 that may match encrypted trades submitted by clients 110, 115, 120, 125, 130, and 135, and may execute at least partially matching trades.

Figure 2:
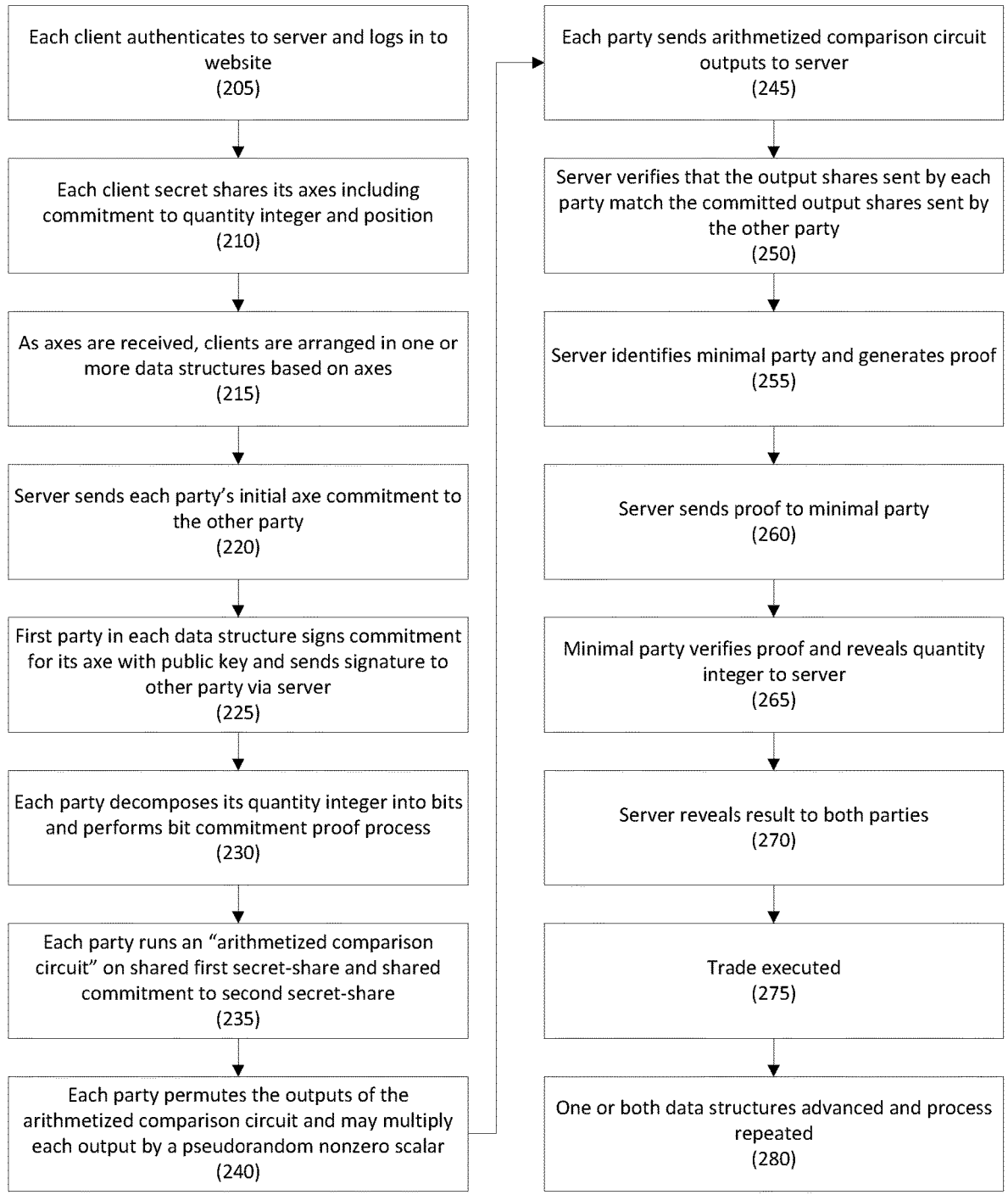
FIG. 2 depicts a method for privacy-preserving inventory matching with security against malicious adversaries according to one embodiment.

Referring to FIG. 2, a method for privacy-preserving inventory matching is disclosed according to one embodiment. The embodiment of FIG. 2 involves client-to-client inventory matching, such as matching a trade (e.g., a buy) from a first client's axe list to an opposite trade (e.g., a sell) on a second client's axe list.

In step 205, clients may authenticate with an operator, such as with a server for an operator that may execute a computer program or application.

In one embodiment, each client may access and log into a website.

In step 210, each client may submit its axe list to the server. In one embodiment, each individual axe in the list may include an asset identifier, a commitment to a quantity (e.g., a non-negative integer of fixed bit-width) and a direction (e.g., long or short). A client may submit axes in both directions, one of which is a dummy (e.g., containing the integer 0). The commitment may be generated using the Pedersen scheme over an elliptic curve of prime order. An example of this scheme is described in B. Bünz, J. Bootle, D. Boneh, A. Poelstra, P. Wuille and G. Maxwell, "Bulletproofs: Short Proofs for Confidential Transactions and More," 2018 IEEE Symposium on Security and Privacy (SP), San Francisco, CA, 2018, pp. 315-334, the disclosure of which is hereby incorporated, by reference, in its entirety.

In step 215, as the axes are received by the server, for each symbol, the axes are arranged in two data structures, one for long submissions and one for short submissions. Examples of such data structures may include queues, stacks, heaps, linked lists, etc. that may be combined by accumulators to cryptographically sum the long and the short axes and reveal the minimum of the two sums. In general, each client owns two axes (one of which is 0). For example, the axes may be arranged in the data structures on a first-in, first-out basis. Other methods for arranging the orders of the data structures may be used as is necessary and/or desired. For example, clients could be ordered using a "tiering system" or a "credit-rating system."

The process of authentication, submission, and ordering the data structures may be repeated for each client until an event, such as a certain time, a certain number of clients have authenticated, etc., has taken place.

In step 220, for each symbol, the server may forward initial axe commitment to the opposite party from one client in each data structure to the other client. For example, if queues are used, the server may forward each of the frontmost clients' (i.e., the first client in the long queue, and the first client in the short queue), initial axe commitment to the opposite party. In step 225, each party sign the commitment to its axe and may send the signature to the other party via the server. To prevent person-in-the-middle attacks, the clients may sign their commitments using mutually known and certified public keys.

For example, the front-most clients may be a long party and a short party.

In step 230, each party may decompose its quantity integer into bits and may conduct a bit-commitment protocol process. Symmetrically, it may verify the proofs it obtains from the other party. An example of a bit commitment proof process is described in FIG. 3.

Figure 3:
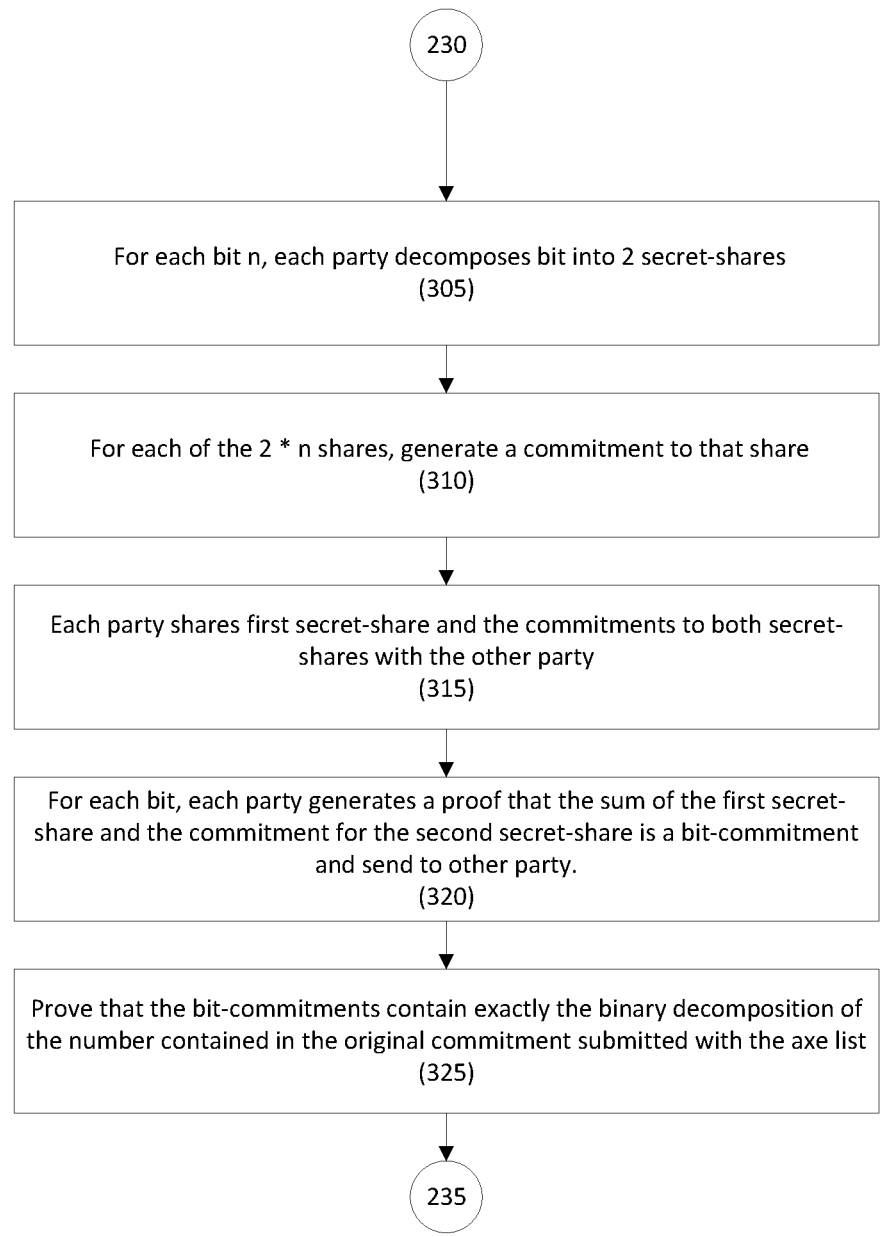
FIG. 3 depicts an exemplary bit commitment proof process according to one embodiment.

Referring to FIG. 3, in step 305, for each bit n in the binary quantity integer, each party may create two secret-shares. For example, each party, for each of its bits, may begin by selecting a random scalar modulo p, and then proceed to select a second scalar whose sum with the first equals the given bit.

In step 310, each party may, for each of its bits, generate a commitment to each of the bit's two secret-shares.

In step 315, each party may share the first secret-share and the commitments to both secret-shares with the other party. In embodiments, the commitment to the first secret-share is provided again in order to facilitate bit-commitment checks and the "sum equality" check, both performed below. For example, in order to check whether the two secret-shares add to a bit, the other party must get a commitment to the sum, i.e., both secret-shares, so the other party knows what to check against.

Thus, from the perspective of each individual party, there will be, for each bit, in total (1) a secret-share of that party's own bit value, which belongs to that party, and which is not ever released or disclosed; (2) a secret-share of the party's own bit value which "belongs" to the other party, and which this party shares with the other party; (3) a secret share of the other party's bit value, which the other party owns, and will not ever disclose to this party (symmetrically to (1)), (4) a secret-share of the other party's bit value that belongs to this party, and which this party has received from the other party (the other party is symmetrically following (2)); (5) a commitment to this party's secret-share (1) belonging to itself, which it now sends to the other party; (6) a commitment to its secret-share (2) belonging to the other party, which it now sends to the other party; (7) a commitment to the other party's secret-share which belongs to the other party, which the other party never disclosed (the other party is symmetrically following (5)); and (8) a commitment to the secret-share it has already received in (4), which the other party now sends to it (the other party is symmetrically following (6)).

Each party, upon receiving (4) and (8), may immediately verify that the secret-shares match the commitments. Symmetrically, the other party may verify that this party's sent shares (2) and its sent commitments (6) match. If any verifications fail, the parties may terminate the procedure. The parties will use the remaining quantities below.

In step 320, for each bit, each party may generate a proof that the sum of the commitment to its first secret-share and the commitment to its second secret-share is a bit commitment and may send the proof to the other party. For example, the bit commitment may prove to the other party that the sum represents a bit and not an arbitrary integer modulo p.

In step 325, each party may prove that the bits represented by the respective summed commitments give exactly the bits of the binary decomposition of the initial commitment submitted with the axe list.

Referring again to FIG. 2, in step 235, each party may run an arithmetized comparison circuit on the shared first secret-share and the received commitment to the other party's second secret-share. This circuit is an "arithmetized" version of a standard Boolean circuit which compares two fixed-width unsigned integers, represented in binary form.

This standard circuit—which is used in modern computer chips—compares its two input arguments bit-by-bit, starting from the arguments' respective most-significant bits (MSBs). The circuit's first output wire compares these most-significant bits, outputting a 1 if and only if its first argument's MSB is 1 and its second argument's MSB is 0. Its second output wire outputs 1 if and only if the two inputs' MSBs are equal, and moreover, the two inputs' second-most significant bits are 1 and 0, respectively. In general, each among the circuit's n output wires outputs 1 if and only if the circuit's initial arguments have a 1 and 0, respectively, at that particular wire's bit position, and moreover, all more-significant bits are equal. Each of these n "intermediate output" wires can be evaluated using only AND NOT gates, together with an AND-chain of XNOR gates. Finally, the circuit feeds all of the intermediate output wires into a chain of OR gates, ultimately outputting a 1 if and only if at least one of its n intermediate output input wires itself output a 1. It is clear that this circuit correctly evaluates the comparison of its two arguments.

To "arithmetize" this circuit, one must first agree upon an encoding of Boolean values using finite field elements, and then moreover replace each Boolean logic gate with a pre-agreed-upon arithmetic operation in the finite field of p elements, in such a way that the agreed-upon arithmetic operations correctly evaluate the circuit (under the agreed-upon field encoding). For example, one may agree that a value of 0 in the finite field represents the Boolean value true, while a nonzero value in the field represents the Boolean value false. Beginning with the original input values, which are required to be either 0 and 1, one may evaluate certain Boolean logic gates using arithmetic operations. For example, for inputs $x_0$ and $x_1$ which both take values in $\{0, 1\}$, one may compute the logical AND of $x_0$ and $x_1$ by evaluating the arithmetic expression $y:=(1-x_0)+(1-x_1)$. It can be checked explicitly that the output variable y equals 0 if and only if both of the inputs $x_0$ and $x_1$ equal 1, and is nonzero under any other combination of binary input values (we assume here that p>2). Thus, this arithmetic expression correctly evaluates a single Boolean AND gate.

More generally, certain, but not all, circuits may be arithmetized. In particular, the Boolean comparison circuit described above can be arithmetized. Each literal x may be replaced with (1−x) if it appears without a NOT gate, and with x itself if it appears with a NOT gate. Each AND gate—which, in the circuit above, appears only in such a way that its inputs consist of one literal and one negated literal—can be evaluated exactly as in the example above. This leaves the XNOR (or equality) gates, whose evaluation is more challenging. A single XNOR gate, with inputs $x_0$ and $x_1$, can clearly be evaluated via the subtraction expression $x_1-x_0$ (this difference equals 0 if and only if $x_0=x_1$, as desired; otherwise, it equals either −1 or 1). The issue is that when these XNOR gates' outputs are fed into a chain of AND gates, simply adding the XNOR gates' outputs fails to be correct, as there can occur unwanted "cancellations" (in which a sequence of numbers, some of which are nonzero, nonetheless add to 0, because the individual numbers are either −1 or 1). To avoid cancellations, each of the XNOR gates' outputs are multiplied by a successively higher power of 2 before being added into a rolling sum. That is, the $i^{th}$ XNOR gate's output is multiplied by $2^{2+i}$ before being added to the running total, as well as to the output of the $i^{th}$ and gate. It can be shown that this precludes all possible cancellations, and thus that this arithmetization correctly evaluates the initial desired Boolean circuit.

For example, embodiments may fix the integers to be compared as $x_0$ and $x_1$ in $\{0, \ldots, 2^n-1\}$, and get their bit-decompositions denoted by $x_{0,j}$ and $x_{1,j}$ for $j=0, \ldots, n-1$. The comparison algorithm proceeds as follows: for each j, a quantity $w_j$ is computed which equals 0 if and only if $x_{0,j}=x_{1,j}$. Meanwhile, for each j, set $c_j$ to $1+x_{0,j}-x_{1,j}+\Sigma_{k<j} w_k$ and $c_n$ is set to $\Sigma_{k=0 \text{ to } n-1} w_k$. For each j, $c_j=0$ so long as $x_{0,j}<x_{1,j}$ as bits (that is, if $1+x_{0,j}-x_{1,j}=0$) and the higher bits of $x_0$ and $x_1$ agree (inducing the equality $\Sigma_{k<j} w_k=0$). By consequence, some $c_j$, for $j=0, \ldots, n-1$, must equal 0 whenever $x_0<x_1$. Similarly, $c_n=0$ whenever $x_0=x_1$. In summary, $x_0 \le x_1$ implies that some $c_j=0$.

Moreover, given this procedure, the sum $c_j:=1+x_{0,j}-x_{1,j}+\Sigma_{k<j} w_k$ is guaranteed to not equal zero by possible overflows due to the modulo operations. That is, even when $w_k \ne 0$ for some k<j—and hence yielding a "false positive" $c_j=0$, which would falsely assert the inequality $x_0 \le x_1$. To solve this problem, each difference $w_j$ is multiplied by $2^{2+j}$. This algorithm may be run on secret shared values of $x_0$ and $x_1$.

For example, each party may proceed as follows. It evaluates the arithmetized comparison circuit on the secret-shares (1) and (4) (referenced above). In parallel, it also evaluates the arithmetized comparison circuit on the commitments (6) and (7). Symmetrically, the other party runs the comparison circuit on the secret-shares (2) and (3). In parallel, the other party evaluates the arithmetized comparison circuit on the commitments (5) and (8). Each party then sends all of its outputs, including both secret-shares and commitments, to the server. The server may check that each party's outputs exactly match the other party's output commitments, and vice-versa.

In step 240, each party should, after running the arithmetized comparison circuit, obtain a shared secret key which both parties simultaneously possess, possibly using a Diffie-Hellman key exchange (where both public keys are known and certified). Then, the parties may permute the output wires $c_j$ for $j=0, \ldots, n-1$ of the arithmetized comparison circuit, where the permutation used is constructed pseudo-randomly using the parties' shared randomness. For example, the parties may use the Fisher-Yates shuffle algorithm. Moreover, each party may multiply each of its permuted outputs $c_j$ by a pseudorandom nonzero scalar, where again all randomness is taken from the single shared secret seed. For example, the parties could use a deterministic random bit generator (DRBG) to generate a supply of shared randomness from the initial shared secret seed, and may use a Hash-DRBG, for example.

In step 245, each party may send to the server its secret-shares of the arithmetized circuit's outputs and commitments to the other party's secret-shares of the arithmetized circuit's outputs. In one embodiment, the secret-shares may be shares of permuted and scalar-multiplied outputs of the arithmetized comparison circuit.

In step 250, the server may verify that the secret-shares received from each of the parties match the commitments to those secret-share that were submitted to the server by the respective opposite party.

If any secret-share from either of the parties does not match its corresponding commitment sent by the other party, the server may stop the process.

In step 255, the server may identify the minimal party by inspecting the reconstructed outputs $c_j$ of the arithmetized comparison circuit. In particular, if there is a single $c_j$ which is equal to zero, for any $j=0, \ldots, n-1$, then $x_0<x_1$. The server may generate a proof which serves to demonstrate to the minimal party that its integer is indeed minimal.

For example, the server may generate a one-out-of-many proof. An example of a suitable one-out-of-many proofs is described in Groth J., Kohlweiss M. (2015) One-Out-of-Many Proofs: Or How to Leak a Secret and Spend a Coin. In: Oswald E., Fischlin M. (eds) Advances in Cryptology—EUROCRYPT 2015. EUROCRYPT 2015. Lecture Notes in Computer Science, vol 9057. Springer, Berlin, Heidelberg. The disclosure of this document is hereby incorporated, by reference, in its entirety.

In step 260, the server may provide the proof to the minimal party. If the parties had the same quantity integer, the server may send a proof to both parties.

In step 265, the minimal party, or both parties if their quantity integers were the same, may verify the proof. If the verification is successful, the minimal party or parties may reveal the quantity integer to the server.

In step 270, the server may then reveal the result to the parties, including the minimal quantity integer. The server does not know the quantity integer for the non-minimal quantity; nor does the non-minimal party reveal its quantity integer.

In step 275, the trade may be executed for the minimal quantity integer.

In step 280, a next set of clients in one or both the data structures may be selected. For example, if queues are used, the clients one or both of the queues may advance. If the parties had the same quantity integer, the next two parties will be advanced, and the process will be repeated. If the parties had unequal quantity integers, the non-minimal party will remain and the process will be repeated with the next party in the queue that the minimal party came from.

The process may then be repeated for each symbol in the axe lists.

In the above protocol, both clients possess a secret integer input, and the server facilitates a match between these clients; the server itself brings no input. In other embodiments, a secure two-party protocol that can be conducted directly between a single client and the server may be used. In these embodiments, the client, as usual, may bring a secret integer input; moreover, the server also may bring its own secret input. The match may then take place directly between a client and the server.

For example, the client may El Gamal-encrypt its input bits under a secret key that only it knows. The client may then send these encrypted bits to the server with proofs asserting that the ciphertexts it sent indeed encrypt bits, and that the bits that are encrypted represent the same number which the client initially committed to.

Upon receiving these ciphertexts and verifying all proofs, the server may execute the arithmetized comparison circuit homomorphically on the client's ciphertexts. That is, the server uses its own secret inputs, together with the client's encrypted inputs, simultaneously, as inputs to the arithmetized circuit. The server sends the resulting output ciphertexts to the client.

Upon obtaining the output ciphertexts, the client decrypts them using its secret key, and inspects them to identify which among the two arrays of plaintexts contains a 0 element. In this way, the client learns the output bit of the comparison circuit. The client may also generate a one-out-of-many proof, proving that the appropriate array contains a 0 element, and may send the output bit, together with the proof, to the server.

The server may then verify the proof; if it checks, it then also learns the output of the comparison.

Embodiments may thus provide a "hybrid" security guarantee—semi-honest security for the server and malicious security for the client. That it, it protects the server against a malicious client; on the other hand, the client is only protected in case the server is semi-honest (and does not deviate from the protocol).

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for privacy-preserving inventory matching, comprising:
   at a server comprising at least one computer processor:
      receiving a plurality of axe submissions, each axe submission from a party and comprising a direction and a quantity commitment to a quantity integer, wherein the quantity integer is not revealed in the quantity commitment;
      arranging the parties into data structures based on the direction in the party's axe submission;
      for a first party and a second party, the first party and the second party being in different data structures, sending each party's quantity commitment to the other party;
      receiving, from the first party and the second party, output secret-shares of an arithmetized comparison circuit;
      verifying that the output secret-shares of the arithmetized comparison circuit received from the first party and the second party match quantity commitments to the output secret-shares sent by the respective opposite party;
      identifying a minimal party based on the outputs of the arithmetized comparison circuit;
      generating and sending a minimal party identification proof of the minimal party identification to the minimal party;
      receiving a minimal quantity integer from the minimal party, wherein the minimal quantity integer is the quantity integer for the minimal party;
      revealing the minimal quantity integer to the first party and the second party; and
      executing a trade for the minimal quantity integer.

2. The method of claim 1, wherein the quantity commitment is generated using a Pedersen scheme over an elliptic curve of prime order.

3. The method of claim 1, wherein, within each data structure, the parties are arranged based on an order of receipt of each party's axe submission.

4. The method of claim 1, further comprising:
   receiving, from the first party and the second party, a signed quantity commitment; and
   sending, to the other party, the signed quantity commitment.

5. The method of claim 1, wherein the minimal party identification proof is a one-out-of-many proof.

6. The method of claim 1, wherein the minimal party verifies the minimal party identification proof in response to receiving the minimal party identification proof.

7. The method of claim 1, wherein the server sends the minimal party identification proof to the first party and the second party in response to the arithmetized comparison circuit outputs indicating that the first party and the second party have the same quantity integer.

8. The method of claim 1, wherein the data structure comprises a queue.

9. A method for privacy-preserving inventory matching, comprising:
   at a first party electronic device comprising at least one computer processor:
      submitting, to a server, an axe submission comprising a direction and a first party quantity commitment to a first party quantity integer, wherein the first party quantity integer is not revealed in the first party quantity commitment;
      sending, via the server, the first party quantity commitment to a second party and receiving a second party quantity commitment to a second party quantity integer from the second party, wherein the second party quantity integer is not revealed in the second party quantity commitment;
      decomposing the first party quantity integer into a plurality of bits;
      performing a bit-commitment protocol process on the plurality of bits comprising two first party secret-shares;
      sending the second party one of the first party secret-shares;
      receiving a second party secret share from the second party;
      executing an arithmetized comparison circuit on the first party secret-share that was not sent to the second party and the second party secret-share received from the second party;
      sending outputs of the arithmetized comparison circuit to the server, wherein the server verifies that the outputs received from the first party and outputs received from the second party match commitments to the output secret-shares sent by the second party and the first party, respectively;
      receiving, from the server, a minimal party identification proof of that the first party is a minimal party; and
      verifying the minimal party identification and sending the first party quantity integer to the server, wherein the first party quantity integer is a minimal quantity integer;
      wherein a transaction is executed for the minimal quantity integer.

10. The method of claim 9, wherein the first party quantity commitment and/or the second party quantity commitment is generated using a Pedersen scheme over an elliptic curve of prime order.

11. The method of claim 9, wherein the minimal party identification proof is a one-out-of-many proof.

12. The method of claim 9, further comprising:
   verifying the minimal party identification proof in response to receiving the minimal party identification proof.

13. The method of claim 9, wherein the two first party secret-shares are based on a first random scalar modulo p and a selecting a second scalar which sums with the first random scalar modulo p to the bit.

14. The method of claim 9, further comprising:
generating a sum proof that a sum of the commitment to the first party secret-share and the commitment to the second party secret-share is a bit commitment;
sending the sum proof to the second party;
generating a matching proof that the sum of the commitment to the first party secret-share and the commitment to the second party secret-share match bits in the decomposed first party quantity integer; and
sending the matching proof to the second party.

15. The method of claim 9, wherein the arithmetized comparison circuit evaluates the first party secret-share that was not sent to the second party and the second party secret-share received from the second party.

16. A method for privacy-preserving inventory matching, comprising:
at a first party electronic device comprising at least one computer processor:
submitting, to a server, an axe submission comprising a direction and a first party quantity commitment to a first party quantity integer, wherein the first party quantity integer is not revealed in the first party quantity commitment;
sending, via the server, the first party quantity commitment to a second party and receiving a second party quantity commitment to a second party quantity integer from the second party, wherein the second party quantity integer is not revealed in the second party quantity commitment;
decomposing the first party quantity integer into a plurality of bits;
performing a bit-commitment protocol process on the plurality of bits comprising two first party secret-shares;
sending the second party one of the first party secret-shares;
receiving a second party secret share from the second party;
executing an arithmetized comparison circuit on the first party secret-share that was not sent to the second party and the second party secret-share received from the second party;
sending outputs of the arithmetized comparison circuit to the server, wherein the server verifies that the outputs received from the first party and outputs received from the second party match commitments to the output secret-shares sent by the second party and the first party, respectively; and
receiving, from the server, an identification of a minimal quantity integer, wherein the minimal quantity integer is the second party quantity integer;
wherein a transaction is executed for the minimal quantity integer.

17. The method of claim 16, wherein the first party quantity commitment and/or the second party quantity commitment is generated using a Pedersen scheme over an elliptic curve of prime order.

18. The method of claim 16, wherein the two first party secret-shares are based on a first random scalar modulo p and a selecting a second scalar which sums with the first random scalar modulo p to the bit.

19. The method of claim 16, further comprising:
generating a sum proof that a sum of the commitment to the first party secret-share and the commitment to the second party secret-share is a bit commitment;
sending the sum proof to the second party;
generating a matching proof that the sum of the commitment to the first party secret-share and the commitment to the second party secret-share match bits in the decomposed first party quantity integer; and
sending the matching proof to the second party.

20. The method of claim 16, wherein the arithmetized comparison circuit evaluates the first party secret-share that was not sent to the second party and the second party secret-share received from the second party.

* * * * *